US011926757B2

United States Patent
He et al.

(10) Patent No.: US 11,926,757 B2
(45) Date of Patent: Mar. 12, 2024

(54) QUICK-DRYING SOLVENT-FREE SAG-RESISTANT POLYURETHANE WATERPROOF COATING AND PREPARATION METHOD THEREFOR

(71) Applicant: JIANGSU CANLON BUILDING MATERIALS CO., LTD., Suzhou (CN)

(72) Inventors: Xiaogang He, Suzhou (CN); Zhongren Li, Suzhou (CN)

(73) Assignee: JIANGSU CANLON BUILDING MATERIALS CO., LTD., Suzhou (CN)

( * ) Notice: Subject to any disclaimer, the term of this patent is extended or adjusted under 35 U.S.C. 154(b) by 575 days.

(21) Appl. No.: 17/271,959

(22) PCT Filed: Aug. 6, 2019

(86) PCT No.: PCT/CN2019/099409
§ 371 (c)(1),
(2) Date: Feb. 26, 2021

(87) PCT Pub. No.: WO2020/042877
PCT Pub. Date: Mar. 5, 2020

(65) Prior Publication Data
US 2021/0324231 A1    Oct. 21, 2021

(30) Foreign Application Priority Data
Aug. 29, 2018   (CN) .......................... 201810994164.9

(51) Int. Cl.
| | | |
|---|---|---|
| *C09D 175/08* | (2006.01) | |
| *C08G 18/10* | (2006.01) | |
| *C08G 18/12* | (2006.01) | |
| *C08G 18/18* | (2006.01) | |
| *C08G 18/48* | (2006.01) | |
| *C09D 7/20* | (2018.01) | |
| *C09D 7/61* | (2018.01) | |
| *C09D 7/63* | (2018.01) | |

(52) U.S. Cl.
CPC ........... *C09D 175/08* (2013.01); *C08G 18/10* (2013.01); *C08G 18/12* (2013.01); *C08G 18/1808* (2013.01); *C08G 18/4808* (2013.01); *C08G 18/4812* (2013.01); *C09D 7/20* (2018.01); *C09D 7/61* (2018.01); *C09D 7/63* (2018.01)

(58) Field of Classification Search
CPC ...... C08G 18/161; C08G 18/10; C08G 18/12; C09D 175/08
See application file for complete search history.

(56) References Cited

U.S. PATENT DOCUMENTS

| 2014/0024732 A1* | 1/2014 | Wang ...................... C08K 3/02 |
| | | 427/290 |
| 2016/0096976 A1* | 4/2016 | Yoshino ............... C08G 18/324 |
| | | 524/873 |

FOREIGN PATENT DOCUMENTS

| CN | 104745064 A | 7/2015 | |
| CN | 106189798 A | * 12/2016 | ......... C08G 18/4804 |
| CN | 106189798 A | 12/2016 | |
| CN | 107325709 A | 11/2017 | |
| CN | 107573833 A | 1/2018 | |
| CN | 108409932 A | 8/2018 | |
| CN | 109321122 A | 2/2019 | |

OTHER PUBLICATIONS

Machine translation of CN 106189798 (2016, 4 pages).*
International Search Report issued in corresponding International Application No. PCT/CN2019/099409, dated Nov. 1, 2019; 7 pgs.

* cited by examiner

*Primary Examiner* — Brieann R Johnston
(74) *Attorney, Agent, or Firm* — HAUPTMAN HAM, LLP

(57) ABSTRACT

A quick-drying solvent-free sag-resistant polyurethane waterproof coating and preparation method therefor, raw materials therefor comprising a polyurethane prepolymer, a plasticizer, a dispersant, a filler, a dehydrant, a catalyst, a defoamant, and an oxazolidine reactive diluent. The catalyst is composed of pentamethyl dipropylene triamine, tetramethylethylenediamine, and 1,8-diazabicyclo[5.4.0]undecene. Raw materials of the polyurethane prepolymer comprise a polyether diol, a polyether triol, an isocyanate, and a chain extender. The prepolymer is prepared by means of the following method: 1) measuring out the raw materials for the polyurethane prepolymer, and reacting the polyether diol with the isocyanate until reaction is complete; 2) then adding the polyether triol for reaction until reaction is complete; 3) then adding the chain extender for reaction, completing preparation. The waterproof coating preparation method is: i) preparing the polyurethane prepolymer; ii) mixing the prepared polyurethane prepolymer with the rest of the raw materials for the waterproof coating to obtain the final product. The present waterproof coating features such advantages as exceptional film-forming speed and sag resistance, and low viscosity.

11 Claims, No Drawings

QUICK-DRYING SOLVENT-FREE SAG-RESISTANT POLYURETHANE WATERPROOF COATING AND PREPARATION METHOD THEREFOR

RELATED APPLICATIONS

The present application is a National Phase of International Application Number PCT/CN2019/099409 filed Aug. 6, 2019 and claims priority to Chinese Application 201810994164.9 filed Aug. 29, 2018.

TECHNICAL FIELD OF THE INVENTION

The present disclosure involves the field of building waterproof, and specifically relates to a quick-drying solvent-free sag-resistant polyurethane waterproof coating and a preparation method therefor, which is especially suitable for construction in special environments such as rainy days, facades and slope surfaces.

BACKGROUND OF THE INVENTION

Polyurethane waterproof coating is an isocyanate group-containing prepolymer formed by addition polymerization of isocyanate, polyether, etc., with catalyst, anhydrous additives, anhydrous fillers, etc., and processed through mixing and other processes. At present, conventional polyurethane coatings are non-environmental-friendly coatings containing solvents (because conventional polyurethane prepolymers have high viscosity, and in order to reduce costs, manufacturers certainly will add fillers, resulting in greater viscosity of the coating itself, it is difficult to apply if solvents are not added), but due to the introduction of the solvents, the solvent volatilizes during construction, on the one hand, the smell is great, on the other hand it causes air pollution. At the same time, the current polyurethane waterproof coatings also have the disadvantage of slow drying and film formation, which is not conducive to construction in special environments such as rainy days, winter under high-strength environments (if it cannot be dried and formed quickly, the construction period will be delayed, the construction difficulty will be increased, and the construction cost will be increased. In addition, for some large-scale projects, such as South-to-North Water Diversion, basement walls of large-scale system venues, high-speed rails, subways, tunnels, civil defenses, etc., it is necessary to carry out waterproof construction on the facades or slope surfaces, and the current polyurethane waterproof coatings still flow when painted on the facades or slope surfaces, resulting in thin upper part and thick lower part, and the upper part cannot be kept thick, the thickness of the coating film is uneven, for example, for a 1.5 mm thick coating film needs to be painted, the current polyurethane coating may need to be painted 4-5 times, which greatly reduces the efficiency and increases the construction cost.

For example, Chinese invention patent CN107325709A discloses a one-component moisture-curing polyurethane waterproof coating, comprising: a polyether polyol, an isocyanate, a filler, a chain extender and a solvent; wherein the chain extender comprises 1, 6-hexanediol and glycerol, and the solvent mentioned comprises dimethyl carbonate. Dimethyl carbonate has good volatility and has less coating film residue, which can shorten the surface drying time and hard drying time of the polyurethane waterproof coating, and compared with the existing solvents such as toluene and xylene, it does not have any aromatic hydrocarbon component, and has the advantages of low toxicity and little smell, which avoids harm to the human body. However, although this patent improves the types of solvents used to reduce the toxicity of organic solvents, the introduction of solvents will still produce unpleasant smells during the construction process, and the drying and film forming is slow, and it does not have the sag-resistant performance of construction on the facades or slope surfaces.

Another example is the Chinese invention patent CN106189798A, which discloses a one-component thick spraying sag-resistant polyurethane waterproof coating, and the raw material formula of the waterproof coating comprises: 21-27% of a polyether polyol; 5-8% of an isocyanate; 15-22% of a plasticizer; 0.03-0.1% of a dispersing agent; 35-50% of a filler; 0.05-0.2% of dehydrating agent; 0.5-2% of a thixotropic agent; 0.03-0.2% of a catalyst; 0.2-1% of a defoaming agent; and, 0-15% of a solvent. Although this patent achieves the sag-resistant effect to a certain extent, it still adds a solvent in order to reduce the viscosity, and the drying is slow.

SUMMARY OF THE INVENTION

For this purpose, the technical problems to be solved by the present disclosure is to overcome the deficiencies of the prior art, and to provide an improved polyurethane waterproof coating, which can achieve low viscosity without adding solvents, but also has excellent drying film formation speed and sag-resistant performance, and the formed film has excellent physical and mechanical properties, and the surface thereof is smooth and has no pores.

To solve the above technical problems, the present disclosure employs the following technical solution:

A quick-drying solvent-free sag-resistant polyurethane waterproof coating, its raw materials comprises a polyurethane prepolymer, a plasticizer, a dispersing agent, a filler, a dehydrating agent, a catalyst and a defoaming agent, the raw materials further comprise an oxazolidine reactive diluent that accounts for 1-10% by mass of the raw materials, the catalyst is composed of pentamethyl dipropylidene triamine, tetramethylethylenediamine, and 1,8-diazacyclo[5,4,0]undecene, and a feed mass ratio of pentamethyl dipropylidene triamine, tetramethylethylenediamine, and 1,8-diazacyclo[5, 4,0]undecene is (0.5-5):(0.5-3): 1; wherein, raw materials of the polyurethane prepolymer comprise a polyether diol, a polyether triol, an isocyanate, and a chain extender, and the prepolymer is prepared by the following method:
  (1) taking the raw materials of the polyurethane prepolymer, and reacting the polyether diol with the isocyanate until reaction completion;
  (2) adding the polyether triol to reacted materials in Step (1), and reacting until reaction completion;
  (3) adding the chain extender to reacted materials in Step (2) and reacting, to prepare the polyurethane prepolymer.

In the present disclosure, by preparing the polyurethane prepolymer step by step, the polyether chain segment and the isocyanate chain segment can be controlled to be more regular with each other, have a higher degree of polymerization, a narrower molecular weight distribution and a reduced viscosity.

According to some preferred aspects of the present disclosure, a feed mass ratio of the polyether diol, the polyether triol, the chain extender and the isocyanate is (1-5):(0.05-1):(0.001-0.1): 1.

According to some preferred aspects of the present disclosure, in the preparation method of the polyurethane prepolymer, the polyether diol and the polyether triol are respectively dried and dehydrated before being added.

According to some preferred aspects of the present disclosure, in the preparation method of the polyurethane prepolymer, in Step (1), the reaction is carried out at a temperature of 75-85° C. More preferably, in the preparation method of the polyurethane prepolymer, in Step (1), the reaction is carried out at a temperature of 77-83° C.

According to some preferred aspects of the present disclosure, in the preparation method of the polyurethane prepolymer, in Step (2), the reaction is carried out at a temperature of 80-90° C. More preferably, in the preparation method of the polyurethane prepolymer, in Step (2), the reaction is carried out at a temperature of 82-88° C.

According to some preferred aspects of the present disclosure, in the preparation method of the polyurethane prepolymer, in Step (3), the reaction is carried out at a temperature of 80-90° C. More preferably, in the preparation method of the polyurethane prepolymer, in Step (3), the reaction is carried out at a temperature of 82-88° C.

According to some preferred aspects of the present disclosure, in the preparation method of the polyurethane prepolymer, the reactions in Step (1), Step (2) and Step (3) are respectively carried out under the protection of protective gas. In the present disclosure, the protective gas comprises, but is not limited to, nitrogen, argon.

According to some preferred aspects of the present disclosure, an average molecular weight of the polyether diol is 400-2000.

According to some specific and preferred aspects of the present disclosure, the polyether diol is a combination of at least two selected from polyether diol 2000, polyether diol 1000, and polyether diol 400.

According to some preferred aspects of the present disclosure, the isocyanate is a combination of at least two selected from diphenylmethane diisocyanate (MDI), toluene diisocyanate, modified diphenylmethane diisocyanate (modified MDI), isophorone diisocyanate (IPDI) and hexamethylene diisocyanate (HDI).

According to some preferred aspects of the present disclosure, an average molecular weight of the polyether triol is 3000-7000.

According to some specific and preferred aspects of the present disclosure, the polyether triol is selected from polyether triol 330N, polyether triol 4000 and polyether triol 3050, and combinations thereof.

According to some preferred aspects of the present disclosure, the chain extender is selected from Clearlink 1000 4,4'-bis-dibutylaminodicyclohexylmethane, Clearlink 3000 3,3'-dimethyl-4,4'-dibutylaminodicyclohexylmethane, Jefflink 754, Jefflink 555, Jefflink 7027, Jeffamin HK-511, and combinations thereof. In the present disclosure, the selection of the above-mentioned chain extender has a better effect than the currently commonly used methanol, ethanol, glycerol, ethylenediamine, etc., and can adjust the molecular structure and molecular weight of the polyurethane prepolymer, reduce the viscosity of the polyurethane prepolymer, and can also improve the thixotropic properties.

According to some preferred aspects of the present disclosure, the filler is composed of a heavy filler and a nano-scale filler with a feed mass ratio of 1:(0.5-2).

According to some specific and preferred aspects of the present disclosure, the heavy filler is selected from titanium dioxide, heavy calcium carbonate, kaolin, talc powder and combinations thereof.

According to some specific and preferred aspects of the present disclosure, the nano-scale filler is selected from gypsum whiskers, fumed silica, nano-calcium carbonate, nano-aluminum nitride, nano-boron nitride, nano-aluminum borate and combinations thereof.

According to some preferred aspects of the present disclosure, the defoaming agent is composed of a physical defoaming agent and a chemical defoaming agent with a mass ratio of 1:(0.3-3).

According to some specific and preferred aspects of the present disclosure, the physical defoaming agent is selected from polysiloxane defoaming agent and/or silicone defoaming agent.

According to some specific and preferred aspects of the present disclosure, the chemical defoaming agent is selected from calcium oxide, magnesium oxide, calcium hydroxide, latent curing agent and combinations thereof.

According to some specific and preferred aspects of the present disclosure, the plasticizer is selected from diisononyl phthalate (DINP), diisodecyl phthalate (DIDP), chlorinated paraffin, dioctyl adipate, diol benzoate, trioctyl phosphate, phenyl alkylsulfonate, and combinations thereof.

According to some specific and preferred aspects of the present disclosure, the dispersing agent is selected from titanate dispersing agent, silane dispersing agent, carboxylic acid dispersing agent and combinations thereof. For example, the dispersing agent may be silane coupling agent WD50 (from Hubei WD Silicone Co., Ltd.), f108 dispersing agent (from Hangzhou Lin'an Coating Auxiliary Chemical Co., Ltd.), KH550, KH560, Disponer 9250 (from Deuchem (Shanghai) Chemical Co., Ltd.), and the like.

According to some specific and preferred aspects of the present disclosure, the dehydrating agent is a molecular sieve and/or an isocyanate dewatering agent. According to some preferred aspects of the present disclosure, in parts by weight, the raw materials comprise 20-50 parts of the polyurethane prepolymer, 5-50 parts of the plasticizer, 0.1-0.3 parts of the dispersing agent, 20-40 parts of the filler, 0.1-0.3 parts of the dehydrating agent, 0.05-0.2 parts of the catalyst, 0.2-0.6 parts of the defoaming agent, and 2-5 parts of oxazolidine reactive diluent. Another technical solution provided by the present disclosure is, a preparation method for the quick-drying solvent-free sag-resistant polyurethane waterproof coating mentioned above, and the preparation method comprises the following steps:

(i) preparing the polyurethane prepolymer by taking the raw materials of the polyurethane prepolymer, and reacting the polyether diol with the isocyanate until reaction completion, to give Product 1; adding the polyether triol into Product 1 to react until reaction completion, to give Product 2; adding the chain extender into Product 2 to react, to give the polyurethane prepolymer;

(ii) mixing the polyurethane prepolymer prepared in Step (i) with the rest of the raw materials of the waterproof coating, to obtain the quick-drying solvent-free sag-resistant polyurethane waterproof coating.

In the present disclosure, all raw materials are preferably controlled for their moisture content, preferably anhydrous raw materials.

Due to the use of the above technical solutions, the present disclosure has the following advantages over the prior art:

By synthesizing the polyurethane prepolymer step by step, adding a specific oxazolidine reactive diluent, and combining with a composite catalyst to work together, the present disclosure realizes the reduction of system viscosity and the improvement of thixotropic performance without adding solvent, the system has high sag resistance, faster film forming, and is promoted to have better storage stability, and the formed film has excellent physical and mechanical properties, and the surface thereof is smooth and has no pores, so it is especially suitable for construction in special environments such as rainy days, facades and slope surfaces.

DETAILED DESCRIPTION OF EXEMPLARY EMBODIMENTS

In the following, the specific embodiments are combined to further explain the above solutions; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments.

In the following embodiments, unless otherwise specified, all raw materials are commercially available or prepared by conventional methods in the field. Polyether diol 2000, polyether diol 1000, polyether diol 400, polyether triol 330N, polyether triol 4000 and polyether triol 3050 were all purchased from Shandong Dongda Chemical Industry Co., Ltd. (referred to as Dongda).

Diphenylmethane diisocyanate (MDI): it can be MDI-MI from BASF AG (Germany), MDI50 from Wanhua Chemical, and MDI100 from Wanhua Chemical.

Toluene diisocyanate: it can be TDI-80 from Bayer AG (Germany).

Modified diphenylmethane diisocyanate (modified MDI): it can be modified MDI 103C from BASF AG (Germany).

Isophorone diisocyanate (IPDI): purchased from Wanhua Chemical.

Hexamethylene diisocyanate (HDI): purchased from Wanhua Chemical.

The oxazolidine reactive diluent was zoldine RD20, zoldine RD4 from Angus Company (US), and Incozol LV from ICL Company (UK).

Pentamethyl dipropylidene triamine was purchased from Air Chemical (US), tetramethylethylenediamine was purchased from TOSOH Corporation (Japan), and 1,8-diazacyclo[5,4,0]undecene was purchased from Shanghai Kaisai Chemical. The plasticizers diisononyl phthalate (DINP) and diisodecyl phthalate (DIDP) can be purchased from Taiwan UPC Technology Corp.; the plasticizer chlorinated paraffin cp52 was purchased from Danyang Auxiliary Chemical Co., Ltd.

The dispersing agent may be silane coupling agent WD50 from Hubei WD Silicone Co., Ltd., f108 dispersing agent from Hangzhou Lin'an Coating Auxiliary, KH550, KH560, Disponer 9250 from Deuchem Chemical.

Heavy calcium carbonate was LD600 purchased from Suzhou Lida Micron Industry Co., Ltd.

Nano fillers were gypsum whiskers researched and produced by China University of Mining and Technology, B-type nano-calcium carbonate from Hunan Jinjian, fumed silica from Degussa, and hydrophobically modified fumed silica PM20L from Tokuyama Corp. (Japan).

The defoaming agents were defoamer 066N purchased from BYK Chemie, 5500 from Deuchem Chemical, organic silicone defoamers from Shanghai Taiga Additive, calcium oxide from Jiangsu Qunxin Powder, and magnesium oxide from Wuxi Zehui Chemical, calcium hydroxide from Jiangsu Qunxin Powder, latent curing agents from Changde Ailite New Material.

The dehydrating agents were molecular sieves from Luoyang Jalon Micro-nano, a small molecule dewatering agent p-toluenesulfonyl isocyanate from BASF AG (Germany).

Embodiment 1

This embodiment provides a quick-drying solvent-free sag-resistant polyurethane waterproof coating, and its raw materials comprise 400 kg of polyurethane prepolymer, 100 kg of plasticizer DIDP (Taiwan UPC Technology Corp), 20 kg of oxazolidine reactive diluent zoldine RD20 (Angus Company, US), 1 kg of silane coupling agent WD50 (Hubei WD Silicone Co., Ltd.), 0.5 kg of pentamethyl dipropylidene triamine (Air Chemical, US), 0.3 kg of tetramethylethylenediamine (TOSOH Corporation, Japan), 0.2 kg of 1,8-diazacyclo[5,4,0]undecene (Shanghai Kaisai Chemical), 0.5 kg of small molecule dewatering agent p-toluenesulfonyl isocyanate (BASF AG, Germany), 0.5 kg of magnesium oxide (Wuxi Zehui Chemical), 0.5 kg of calcium oxide (Jiangsu Qunxin Powder), 2 kg of defoamer 066N (BYK Chemie), 150 kg of heavy calcium carbonate LD600 (Suzhou Lida Micron Industry Co., Ltd.), 100 kg of B-type nano-calcium carbonate (Hunan Jinjian), and 5 kg of hydrophobically modified fumed silica PM20L (Tokuyama Corp., Japan).

Preparation of the polyurethane prepolymer—the raw materials of the polyurethane prepolymer comprised: 150 kg of polyether diol 2000 (Dongda), 50 kg of polyether diol 1000 (Dongda), 50 kg of polyether diol 400 (Dongda), 50 kg of MDI-MI (BASF AG), 50 kg of modified MDI103c (BASF AG), 50 kg of polyether triol 330N (Dongda), and 2 kg of chain extender Clearlink 1000 4,4'-bis-dibutylaminodicyclohexylmethane. The preparation process was as follows: into the reactor, 150 kg of polyether diol 2000 (Dongda), 50 kg of polyether diol 1000 (Dongda) and 50 kg of polyether diol 400 (Dongda) were added, the system was stirred and slowly warmed up to 120° C., vacuum dehydrated for 2 h, and detected for the moisture content. The temperature was cooled to below 60° C., and 50 kg of MDI-MI (BASF AG) and 50 kg of modified MDI103c (BASF AG) were added, then the temperature was controlled at 80±3° C., the reaction was protected by nitrogen for 1.5 h under stirring, and after reaction completion, 50 kg of polyether triol 330N (Dongda) was added, the temperature was controlled at 85±3° C. to react for 1 h, and after reaction completion, 2 kg of chain extender Clearlink 1000 4,4'-bis-dibutylaminodicyclohexylmethane was added to continue to react for 1 h, to give the polyurethane prepolymer, which was injected into a buffer tank. The filler in the raw materials of the waterproof coating was dried and dehydrated by an infrared dryer to a moisture content below 0.05%, and then stored in the buffer tank for future use.

The preparation method for the waterproof coating was: taking 400 kg of polyurethane prepolymer synthesized according to the method mentioned above, 100 kg of plasticizer DIDP (Taiwan UPC Technology Corp), 20 kg of oxazolidine reactive diluent zoldine RD20 (Angus Company, US), 1 kg of silane coupling agent WD50 (Hubei WD Silicone Co., Ltd.), 0.5 kg of pentamethyl dipropylidene triamine (Air Chemical, US), 0.3 kg of tetramethylethylenediamine (TOSOH Corporation, Japan), 0.2 kg of 1,8-diazacyclo[5,4,0]undecene (Shanghai Kaisai Chemical), 0.5 kg of small molecule dewatering agent p-toluenesulfonyl isocyanate (BASF AG, Germany), 0.5 kg of magnesium oxide (Wuxi Zehui Chemical), 0.5 kg of calcium oxide (Jiangsu Qunxin Powder), and 2 kg of defoamer 066N (BYK Chemie), stirring in a planetary dispersion tank and keeping below 60° C. and stirring for 30 minutes, adding 150 kg of heavy calcium carbonate LD600 (Suzhou Lida Micron Industry), 100 kg of B-type nano-calcium carbonate (Hunan Jinjian) and 5 kg of hydrophobically modified fumed silica PM20L (Tokuyama Corp., Japan), degassing and stirring under −0.08 MPa vacuum for 1-2 hours, and testing the fineness by a scraper fineness meter until below 50 μm, to obtain the quick-drying solvent-free sag-resistant polyurethane waterproof coating.

The measured performance was as follows:

The solid content was 98.2%, the surface drying time was 1.5 hours, the hard drying time was 2 hours, the 7-days tensile strength was 3.2 MPa, the elongation at break is 640%, the tear strength was 17 N/mm, and the viscosity was 12,500 MPa·s (20° C.).

The situation after coat application was as follows: a thick coating of 1 mm did not flow.

Embodiment 2

This embodiment provides a quick-drying solvent-free sag-resistant polyurethane waterproof coating and its raw materials comprise 400 kg of polyurethane prepolymer, 50 kg of plasticizer DIDP (Taiwan UPC Technology Corp), 20 kg of oxazolidine reactive diluent zoldine RD20 (Angus Company, US), 1 kg of fl08 dispersing agent (Hangzhou Lin'an Coating Auxiliary), 0.5 kg of pentamethyl dipropylidene triamine (Air Chemical, US), 0.5 kg of tetramethylethylenediamine (TOSOH Corporation, Japan), 0.5 kg of 1,8-diazacyclo[5,4,0]undecene (Shanghai Kaisai Chemical), 1 kg of small molecule dewatering agent p-toluenesulfonyl isocyanate (BASF AG, Germany), 0.5 kg of molecular sieve (Luoyang Jalon Micro-nano), 1 kg of chemical defoaming agent magnesium oxide, 2 kg of defoaming agent 5500 (Deuchem Chemical), 100 kg of heavy calcium carbonate LD600 (Suzhou Lida Micron Industry Co., Ltd.), 190 kg of B-type nano-calcium carbonate (Hunan Jinjian), and 10 kg of gypsum whiskers (researched and produced by China University of Mining and Technology).

Preparation of the polyurethane prepolymer—the raw materials of the polyurethane prepolymer comprised: 50 kg of polyether diol 2000 (Dongda), 80 kg of polyether diol 1000 (Dongda), 80 kg of polyether diol 400 (Dongda), 80 kg of MDI-50 (Wanhua Chemical), 50 kg of TDI-80 (Bayer AG, Germany), 90 kg of polyether triol 330N (Dongda), and 2 kg of chain extender Jeffamin HK-511. The preparation process was as follows: into the reactor, 50 kg of polyether diol 2000 (Dongda), 80 kg of polyether diol 1000 (Dongda) and 80 kg of polyether diol 400 (Dongda) were added, the system was stirred and slowly warmed up to 120° C., vacuum dehydrated for 2 h, and detected for the moisture content. The temperature was cooled to below 60° C., and 80 kg of MDI-50 (Wanhua Chemical) and 50 kg of TDI-80 (Bayer A G, Germany) were added, then the temperature was controlled at 80±3° C., the reaction was protected by nitrogen for 1.5 h under stirring, and after reaction completion, 90 kg of polyether triol 330N (Dongda) was added, the temperature was controlled at 85±3° C. to react for 1 h, and after reaction completion, 2 kg of chain extender Jeffamin HK-511 was added to continue to react for 1 h, to give the polyurethane prepolymer, which was injected into a buffer tank.

The filler in the raw materials of the waterproof coating was dried and dehydrated by an infrared dryer to a moisture content below 0.05%, and then stored in the buffer tank for future use.

The preparation method for the waterproof coating was: taking 400 kg of polyurethane prepolymer synthesized according to the method mentioned above, 50 kg of plasticizer DIDP (Taiwan UPC Technology Corp), 20 kg of oxazolidine reactive diluent zoldine RD20 (Angus Company, US), 1 kg of fl08 dispersing agent (Hangzhou Lin'an Coating Auxiliary), 0.5 kg of pentamethyl dipropylidene triamine (Air Chemical, US), 0.5 kg of tetramethylethylenediamine (TOSOH Corporation, Japan), 0.5 kg of 1,8-diazacyclo[5,4,0]undecene (Shanghai Kaisai Chemical), 1 kg of small molecule dewatering agent p-toluenesulfonyl isocyanate (BASF AG, Germany), 0.5 kg of molecular sieve (Luoyang Jalon Micro-nano), 2 kg of defoaming agent 5500 (Deuchem Chemical), and 1 kg of chemical defoaming agent magnesium oxide, stirring in a planetary dispersion tank and keeping below 60° C. and stirring for 30 minutes, adding 100 kg of heavy calcium carbonate LD600 (Suzhou Lida Micron Industry), 190 kg of B-type nano-calcium carbonate (Hunan Jinjian) and 10 kg of gypsum whiskers (researched and produced by China University of Mining and Technology), degassing and stirring under −0.08 MPa vacuum for 1-2 hours, and testing the fineness by a scraper fineness meter until below 50 μm, to obtain the quick-drying solvent-free sag-resistant polyurethane waterproof coating.

The measured performance was as follows:

The solid content was 98.7%, the surface drying time was 1 hours, the hard drying time was 2 hours, the 7-days tensile strength was 3.6 MPa, the elongation at break is 820%, the tear strength was 25 N/mm, and the viscosity was 13,600 mp·s (20° C.).

The situation after coat application was as follows: a thick coating of 15 mm did not flow.

Embodiment 3

This embodiment provides a quick-drying solvent-free sag-resistant polyurethane waterproof coating, and its raw materials comprise 400 kg of polyurethane prepolymer, 150 kg of plasticizer chlorinated paraffin cp52 (Danyang Auxiliary Chemical), 50 kg of oxazolidine reactive diluent Incozol LV (ICL Company, UK), 1 kg of defoaming agent 5500 (Deuchem Chemical), 1 kg of 066N (BYK Chemie), 3 kg of fl08 (Hangzhou Lin'an Coating Auxiliary), 0.4 kg of pentamethyl dipropylidene triamine (Air Chemical, US), 0.1 kg of tetramethylethylenediamine (TOSOH Corporation, Japan), 0.1 kg of 1,8-diazacyclo[5,4,0]undecene (Shanghai Kaisai Chemical), 2 kg of molecular sieve (Luoyang Jalon Micro-nano), 3 kg of chemical defoaming agent magnesium oxide, 200 kg of heavy calcium carbonate LD600 (Suzhou Lida Micron Industry Co., Ltd.), 200 kg of B-type nano-calcium carbonate (Hunan Jinjian), 5 kg of gypsum whiskers (researched and produced by China University of Mining and Technology), and 5 kg of hydrophobically modified fumed silica PM20L (Tokuyama Corp, Japan).

Preparation of the polyurethane prepolymer—the raw materials of the polyurethane prepolymer comprised: 100 kg of polyether diol 2000 (Dongda), 20 kg of polyether diol 1000 (Dongda), 100 kg of polyether diol 400 (Dongda), 100 kg of IPDI (Wanhua Chemical), 50 kg of 103C (BASF AG), 20 kg of polyether triol 330N (Dongda), and 3 kg of chain extender Clearlink 3000 3,3'-dimethyl-4,4'-dibutylaminodicyclohexylmethane. The preparation process was as follows: into the reactor, 100 kg of polyether diol 2000 (Dongda), 20 kg of polyether diol 1000 (Dongda) and 100 kg of polyether diol 400 (Dongda) were added, the system was stirred and slowly warmed up to 120° C., vacuum dehydrated for 2 h, and detected for the moisture content. The temperature was cooled to below 60° C., and 100 kg of IPDI (Wanhua Chemical) and 50 kg of modified MDI103c (BASF AG) were added, then the temperature was controlled at 80±3° C., the reaction was protected by nitrogen for 1.5 h under stirring, and after reaction completion, 20 kg of polyether triol 330N (Dongda) was added, the temperature was controlled at 85±3° C. to react for 1 h, and after reaction completion, 3 kg of chain extender Clearlink 3000 3,3'-dimethyl-4,4'-dibutylaminodicyclohexylmethane was added to continue to react for 1 h, to give the polyurethane prepolymer, which was injected into a buffer tank.

The filler in the raw materials of the waterproof coating was dried and dehydrated by an infrared dryer to a moisture content below 0.05%, and then stored in the buffer tank for future use.

The preparation method for the waterproof coating was: taking 400 kg of polyurethane prepolymer synthesized according to the method mentioned above, 150 kg of chlorinated paraffin cp52, 50 kg of oxazolidine reactive diluent Incozol LV (ICL Company, UK), 1 kg of defoaming agent 5500 (Deuchem Chemical), 1 kg of defoaming agent 066N (BYK Chemie), 3 kg of dispersing agent f108 (Hangzhou Lin'an Coating Auxiliary), 0.4 kg of pentamethyl dipropylidene triamine (Air Chemical, US), 0.1 kg of tetramethylethylenediamine (TOSOH Corporation, Japan), 0.1 kg of 1,8-diazacyclo[5,4,0]undecene (Shanghai Kaisai Chemical), 2 kg of molecular sieve (Luoyang Jalon Micro-nano), and 3 kg of chemical defoaming agent magnesium oxide, stirring in a planetary dispersion tank and keeping below 60° C. and stirring for 30 minutes, adding 200 kg of heavy calcium carbonate LD600 (Suzhou Lida Micron Industry), 200 kg of B-type nano-calcium carbonate (Hunan Jinjian), 5 kg of gypsum whiskers (researched and produced by China University of Mining and Technology) and 5 kg of hydrophobically modified fumed silica PM20L (Tokuyama Corp, Japan), degassing and stirring under −0.08 MPa vacuum for 1-2 hours, and testing the fineness by a scraper fineness meter until below 50 μm, to obtain the quick-drying solvent-free sag-resistant polyurethane waterproof coating.

The measured performance was as follows:

The solid content was 98.9%, the surface drying time was 1 hours, the hard drying time was 2 hours, the 7-days tensile strength was 4.2 MPa, the elongation at break is 940%, the tear strength was 27 N/mm, and the viscosity was 11,000 mp·s (20° C.).

The situation after coat application was as follows: a thick coating of 2 mm did not flow.

Comparison 1

It is basically the same as Embodiment 1, by only differing in that the polyurethane prepolymer was prepared by simultaneously mixing the polyether diol, the polyether triol, the isocyanate and the chain extender to react.

The measured properties of the prepared polyurethane waterproof coating are as follows:

The solid content was 98.4%, the surface drying time was 5 hours, the hard drying time was 19 hours, the 7-days tensile strength was 2.5 MPa, the elongation at break is 700%, the tear strength was 14.8 N/mm, and the viscosity was 56,900 mp·s (20° C.).

The situation after coat application was as follows: a thick coating of 1 mm seriously flowed, exceeding 10 cm.

Comparison 2

It is basically the same as Embodiment 1, by only differing in that the catalyst is replaced with a single dibutyltin dilaurate commonly used in polyurethane waterproof coatings.

The measured properties of the prepared polyurethane waterproof coating are as follows:

The solid content was 98.4%, the surface drying time was 7 hours, the hard drying time was 22 hours, the 7-days tensile strength was 2.8 MPa, the elongation at break is 670%, the tear strength was 15 N/mm, and the viscosity was 26,700 Mpa·s (20° C.).

The situation after coat application was as follows: a thick coating of 15 mm flowed for 5 cm.

Comparison 3

It is basically the same as Embodiment 1, by only differing in that only pentamethyl dipropylidene triamine was used as the catalyst.

The measured properties of the prepared polyurethane waterproof coating are as follows:

The solid content was 98.5%, the surface drying time was 5 hours, the hard drying time was 16 hours, the 7-days tensile strength was 2.1 MPa, the elongation at break is 560%, the tear strength was 16 N/mm, and the viscosity was 16,000 Mpa·s (20° C.).

The situation after coat application was as follows: a thick coating of 2 mm did not flow.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A quick-drying solvent-free sag-resistant polyurethane waterproof coating, wherein its raw materials comprises a polyurethane prepolymer, a plasticizer, a dispersing agent, a filler, a dehydrating agent, a catalyst and a defoaming agent, the raw materials further comprise an oxazolidine reactive diluent that accounts for 1-10% by mass of the raw materials, the catalyst is composed of pentamethyl dipropylidene triamine, tetramethylethylenediamine, and 1,8-diazacyclo[5,4,0]undecene, and a feed mass ratio of pentamethyl dipropylidene triamine, tetramethylethylenediamine, and 1,8-diazabicyclo[5,4,0]undecane is (0.5-5):(0.5-3): 1; wherein, raw materials of the polyurethane prepolymer comprise a polyether diol, a polyether triol, an isocyanate, and a chain extender, and the prepolymer is prepared by the following method:

(1) taking the raw materials of the polyurethane prepolymer, and reacting the polyether diol with the isocyanate until reaction completion;

(2) adding the polyether triol to reacted materials in Step (1), and reacting until reaction completion; and (3) adding the chain extender to reacted materials in Step (2) and reacting, to prepare the polyurethane prepolymer.

2. The quick-drying solvent-free sag-resistant polyurethane waterproof coating according to claim 1, wherein in the preparation method of the polyurethane prepolymer, the polyether diol and the polyether triol are respectively dried and dehydrated before being added.

3. The quick-drying solvent-free sag-resistant polyurethane waterproof coating according to claim 1, wherein in the preparation method of the polyurethane prepolymer, in Step (1), the reaction is carried out at a temperature of 75-85° C., and in Step (2) and Step (3), the reactions are respectively carried out at 80-90° C.

4. The quick-drying solvent-free sag-resistant polyurethane waterproof coating according to claim 1, wherein in the preparation method of the polyurethane prepolymer, the reactions in Step (1), Step (2) and Step (3) are respectively carried out under the protection of protective gas.

5. The quick-drying solvent-free sag-resistant polyurethane waterproof coating according to claim 1, wherein the isocyanate is a combination of at least two selected from diphenylmethane diisocyanate, toluene diisocyanate, modified diphenylmethane diisocyanate, isophorone diisocyanate and hexamethylene diisocyanate.

6. The quick-drying solvent-free sag-resistant polyurethane waterproof coating according to claim 1, wherein the chain extender is selected from 4,4'-bis-dibutylaminodicyclohexylmethane, 3,3'-dimethyl-4,4'-dibutylaminodicyclohexylmethane, and combinations thereof.

7. The quick-drying solvent-free sag-resistant polyurethane waterproof coating according to claim 1, wherein the filler is composed of a heavy filler and a nano-scale filler with a feed mass ratio of 1:(0.5-2), and the heavy filler is selected from titanium dioxide, heavy calcium carbonate, kaolin, talc powder and combinations thereof, and the nano-scale filler is selected from gypsum whiskers, fumed silica, nano-calcium carbonate, nano-aluminum nitride, nano-boron nitride, nano-aluminum borate and combinations thereof.

8. The quick-drying solvent-free sag-resistant polyurethane waterproof coating according to claim 1, wherein the defoaming agent is composed of a physical defoaming agent and a chemical defoaming agent with a mass ratio of 1:(0.3-3), the physical defoaming agent is selected from polysiloxane defoaming agents and/or silicone defoaming agents, and the chemical defoaming agent is selected from calcium oxide, magnesium oxide, calcium hydroxide, latent curing agents and combinations thereof.

9. The quick-drying solvent-free sag-resistant polyurethane waterproof coating according to claim 1, wherein the plasticizer is selected from diisononyl phthalate, diisodecyl phthalate, chlorinated paraffin, dioctyl adipate, diol benzoate, trioctyl phosphate, phenyl alkylsulfonate and combinations thereof; and/or, the dispersing agent is selected from titanate dispersing agents, silane dispersing agents, carboxylic acid dispersing agents and combinations thereof; and/or, the dehydrating agent is a molecular sieve and/or an isocyanate dewatering agent.

10. The quick-drying solvent-free sag-resistant polyurethane waterproof coating according to claim 1, wherein in parts by weight, the raw materials comprise 20-50 parts of the polyurethane prepolymer, 5-50 parts of the plasticizer, 0.1-0.3 parts of the dispersing agent, 20-40 parts of the filler, 0.1-0.3 parts of the dehydrating agent, 0.05-0.2 parts of the catalyst, 0.2-0.6 parts of the defoaming agent, and 2-5 parts of oxazolidine reactive diluent.

11. A preparation method for the quick-drying solvent-free sag-resistant polyurethane waterproof coating according to, claim 1, wherein the preparation method comprises the following steps:
    (i) preparing polyurethane prepolymer by taking the raw materials of the polyurethane prepolymer, and reacting the polyether diol with the isocyanate until reaction completion, to give Product (1); adding the polyether triol into Product (1) to react until reaction completion, to give Product (2); adding the chain extender into Product (2) to react, to give the polyurethane prepolymer; and
    (ii) mixing the polyurethane prepolymer prepared in Step (i) with the rest of the raw materials of the waterproof coating, to obtain the quick-drying solvent-free sag-resistant polyurethane waterproof coating.

* * * * *